United States Patent
Zaki et al.

(10) Patent No.: US 10,959,202 B2
(45) Date of Patent: Mar. 23, 2021

(54) FAST TIMING ACQUISITION FOR DISCONTINUOUS RECEPTION (DRX)

(71) Applicant: QUALCOMM Incorporated, San Diego, CA (US)

(72) Inventors: Ahmed Zaki, Bengaluru (IN); Vijayvaradharaj Tirucherai Muralidharan, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 20 days.

(21) Appl. No.: 16/415,987

(22) Filed: May 17, 2019

(65) Prior Publication Data

US 2020/0367188 A1    Nov. 19, 2020

(51) Int. Cl.
*H04L 7/00* (2006.01)
*H04W 56/00* (2009.01)
(Continued)

(52) U.S. Cl.
CPC ....... *H04W 56/0065* (2013.01); *H04L 1/0054* (2013.01); *H04L 1/0061* (2013.01); *H04W 52/0232* (2013.01); *H04W 76/28* (2018.02)

(58) Field of Classification Search
CPC ............ H04W 56/001; H04W 72/005; H04W 72/0466; H04W 56/0065; H04W 76/28;
(Continued)

(56) References Cited

U.S. PATENT DOCUMENTS 9,924,503 B2 * 3/2018 Kim ................. H04W 74/0833
10,721,727 B2 * 7/2020 Rico Alvarino .... H04W 72/042
(Continued)

OTHER PUBLICATIONS

Huawei., et al., "Discussion on Maximum Idle Mode DRX-Value in NR," 3GPP Draft, 3GPP TSG-RAN-WG2#99 Meeting, R2-1708066, Discussion on Maximum Idle Mode DRX Value in NR, 3rd Generation Partnership Project (3GPP), Mobile Competence Centre, 650, Route Des Lucioles, F-06921, Sophia-Antipolis Cedex, France, vol. RAN WG2, No. Berlin, Germany; Aug. 21, 2017-Aug. 25, 2017, Aug. 20, 2017 (Aug. 20, 2017), XP051317971, 2 pages, Retrieved from the Internet: URL: http://www.3gpp.org/ftp/Meetings_3GPP_SYNC/RAN2/Docs/ [retrieved on Aug. 20, 2017] the.
(Continued)

*Primary Examiner* — Wutchung Chu
(74) *Attorney, Agent, or Firm* — Patterson & Sheridan, L.L.P

(57) ABSTRACT

Techniques performed by a User Equipment (UE) are provided for fast timing acquisition for Discontinuous Reception (DRX) cycles. The UE determines one or more System Frame Number (SFN) hypotheses. Each of the one or more SFN hypothesis can represent a possible SFN at which the UE can wake up from a sleep state of a Discontinuous Reception (DRX) cycle. For at least one of the one or more SFN hypotheses, the UE generates a detection metric based at least partially on a Physical Broadcast Channel (PBCH) sequence received from a base station, and determines, based on a value of the detection metric, whether the at least one SFN hypothesis represents a current SFN in accordance with a clock source used the base station for communicating with the UE. Other aspects, embodiments, and features are also claimed and described.

31 Claims, 11 Drawing Sheets

(51) Int. Cl.
*H04L 1/00* (2006.01)
*H04W 76/28* (2018.01)
*H04W 52/02* (2009.01)

(58) Field of Classification Search
CPC .......... H04W 52/0232; H04W 52/029; H04W 76/27; H04L 25/03866; H04L 5/0048; H04L 5/005; H04L 5/0053; H04L 5/0051; H04L 1/0054; H04L 1/0061; Y02D 70/24
See application file for complete search history.

(56) References Cited

U.S. PATENT DOCUMENTS

| | | | | |
|---|---|---|---|---|
| 2008/0056422 | A1* | 3/2008 | Rao | H04W 52/029 375/357 |
| 2010/0203892 | A1* | 8/2010 | Nagaraja | H04W 36/30 455/437 |
| 2011/0190019 | A1* | 8/2011 | Woo | H04W 68/00 455/515 |
| 2014/0198696 | A1* | 7/2014 | Li | H04W 52/0229 370/311 |
| 2014/0301263 | A1* | 10/2014 | Ji | H04W 52/0216 370/311 |
| 2016/0014718 | A1* | 1/2016 | Mysore Balasubramanya | H04W 52/0216 455/458 |
| 2016/0050624 | A1* | 2/2016 | Tirronen | H04W 52/0216 370/311 |
| 2016/0135058 | A1* | 5/2016 | Chen | H04L 5/0053 370/329 |
| 2017/0251499 | A1* | 8/2017 | Radulescu | H04L 41/0866 |
| 2018/0167946 | A1* | 6/2018 | Si | H04W 72/005 |
| 2018/0227867 | A1* | 8/2018 | Park | H04W 56/001 |
| 2018/0270756 | A1* | 9/2018 | Bhattad | H04W 76/27 |
| 2018/0279203 | A1* | 9/2018 | da Silva | H04W 48/10 |
| 2018/0332549 | A1 | 11/2018 | Bhattad et al. | |
| 2019/0090293 | A1* | 3/2019 | Su | H04W 56/0015 |
| 2019/0166611 | A1* | 5/2019 | Noh | H04L 1/0072 |
| 2019/0326934 | A1* | 10/2019 | Kim | H04W 72/0446 |
| 2020/0053670 | A1* | 2/2020 | Jung | H04W 56/0015 |
| 2020/0154461 | A1* | 5/2020 | Bahng | H04W 72/042 |
| 2020/0220662 | A1* | 7/2020 | Park | H04W 72/005 |

OTHER PUBLICATIONS

International Search Report and Written Opinion—PCT/US2020/025799—ISA/EPO—dated Jul. 17, 2020.

Nokia, et al., "Wake-up Signal for efeMTC," 3GPP Draft, 3GPP TSG RAN WG1 Meeting #93, R1-1806174, 3rd Generation Partnership Project (3GPP), Mobile Competence Centre, 650, Route Des Lucioles, F-06921, Sophia-Antipolis Cedex, France, vol. RAN WG1, No, Busan, Korea; May 21, 2018-May 25, 2018, May 20, 2018 (May 20, 2018), XP051441383, 7 pages, Retrieved from the Internet: URL: http://www.3gpp.org/ftp/Meetings%5F3GPP%5FSYNC/RAN1/Docs/ [retrieved on May 20, 2018] paragraph [0003] paragraph [0004].

* cited by examiner

| Timing error +/- (in msec) | Nmax | Number of hypothesis | Max number of TBCC |
|---|---|---|---|
| 10 | 1 | 3 | 2 |
| 20 | 2 | 5 | 2 |
| 30 | 3 | 7 | 3 |
| 40 | 4 | 9 | 3 |
| 50 | 5 | 11 | 4 |
| 60 | 6 | 13 | 4 |
| 70 | 7 | 15 | 5 |
| 80 | 8 | 17 | 5 |

| SNR in dB ⌐902 | Proposed scheme ⌐904 | Baseline scheme ⌐906 | Power saving % ⌐908 |
|---|---|---|---|
| −19 | 26 | 13550 | 99.8 |
| −18 | 22 | 4593 | 99.5 |
| −17 | 16 | 1120 | 98.5 |
| −16 | 12 | 313 | 96.1 |
| −15 | 10 | 95 | 89.5 |

FIG. 9

FAST TIMING ACQUISITION FOR DISCONTINUOUS RECEPTION (DRX)

TECHNICAL FIELD

Aspects of the present disclosure relate to wireless communications, and more particularly, to techniques for fast timing acquisition for Discontinuous Reception (DRX). Some disclosed embodiments and techniques can enable and provide power savings, efficient paging, and timing corrections that may be encountered in deep sleep scenarios and/or varied reception modes such as discontinuous reception (e.g., timing corrections by using broadcast channel decoding over a set of system frames).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a User Equipment (UE). A sample method generally includes determining one or more System Frame Number (SFN) hypotheses, each of the one or more SFN hypotheses representing a possible SFN at which the UE can wake up from a sleep state of a Discontinuous Reception (DRX) cycle. For at least one of the one or more SFN hypotheses a detection metric is generated based at least partially on a Physical Broadcast Control Channel (PBCH) sequence received from a base station; and the UE determines, based on a value of the detection metric, whether the at least one SFN hypothesis represents a current SFN in accordance with a clock source used by the base station for communicating with the UE. The UE determines, based on the at least one SFN hypothesis, a timing to be used for communicating with the base station, when the at least one SFN hypothesis is determined as representing the current SFN; and communicates with the base station based on the determined timing.

In an aspect, the method further includes determining a timing error related to a sleep state clock used by the UE in the sleep state of the DRX cycle, wherein the one or more SFN hypotheses is determined based at least one the timing error. In an aspect the timing error includes a maximum timing error related to the sleep state clock source used in the sleep state.

In an aspect, wherein determining the timing error includes determining the timing error as a function of a timing offset error related to the sleep state clock source and a sleep duration of the sleep state, wherein a value of the timing error comprises a number of frames, and wherein the one or more SFN hypotheses comprises one or more SFN hypothesis from a range of SFN hypotheses, wherein the range is a function of the value of the timing error.

In an aspect, determining whether the at least one SFN hypothesis represents a current SFN includes determining that the at least one SFN hypothesis represents a current SFN in accordance with the clock source, when a value of the detection metric exceeds a threshold value.

In an aspect, the method further includes for the at least one SFN hypothesis, generating a Physical Broadcast Channel (PBCH) sequence.

In an aspect, generating the detection metric includes comparing each coded bit in the generated PBCH sequence with a Log Likelihood Ratio (LLR) value representing a corresponding coded bit in the PBCH sequence received from the base station; flipping a sign of the LLR value when the corresponding coded bit in the generated PBCH sequence is minus one; and after the comparing and flipping has been performed for all coded bits in the generated PBCH sequence, generating a value of the detection metric by adding the remaining LLR values.

In an aspect, a PBCH payload corresponding to the generated PBCH sequence for the at least one SFN hypothesis comprises a first portion indicating an SFN corresponding to the SFN hypothesis and a second portion indicating other system information, wherein the SFN changes for only certain SFN hypotheses while the other system information remains the same.

In an aspect, generating the PBCH sequence for the at least one SFN hypothesis includes obtaining system information from a previous transmission of the PBCH; constructing a PBCH payload based on the obtained system information and the SFN corresponding to the at least one SFN hypothesis; generating PBCH data by adding cyclic redundancy check (CRC) bits to the constructed PBCH payload; coding the generated PBCH data to generate coded PBCH data; and scrambling the coded PBCH data to generate the PBCH sequence.

In an aspect, the generating the PBCH data and the coding is performed every fourth SFN hypothesis, wherein mod (SFN,4)=0, and wherein the scrambling is performed for every SFN hypothesis.

In an aspect, the detection metric indicates a level of correlation between the generated PBCH sequence and the actual PBCH sequence, wherein a higher value of the metric indicates a higher level of correlation.

In an aspect, the one or more SFN hypotheses is further based on an SFN calculated by the UE at start of SFN acquisition assuming zero timing error.

Certain aspects of the present disclosure provide an apparatus for wireless communication by a UE. The apparatus generally includes at least one processor and a memory coupled to the at least one processor. The processor is generally configured to determine one or more System Frame Number (SFN) hypotheses, each of the one or more SFN hypotheses representing a possible SFN at which the UE can wake up from a sleep state of a Discontinuous Reception (DRX) cycle. For at least one of the one or more SFN hypotheses the at least one apparatus generates a detection metric based at least partially on a Physical Broadcast Control Channel (PBCH) sequence received from a base station; and determines, based on a value of the detection metric, whether the at least one SFN hypothesis represents a current SFN in accordance with a clock source used by the base station for communicating with the UE. The at least one apparatus determines, based on the at least one SFN hypothesis, a timing to be used for communicating with the base station, when the at least one SFN hypothesis is determined as representing the current SFN; and communicates with the base station based on the determined timing.

In an aspect, the at least one processor is further configured to determine a timing error related to a sleep state clock used by the UE in the sleep state of the DRX cycle, wherein the one or more SFN hypotheses is determined based at least one the timing error.

In an aspect, the timing error comprises a maximum timing error related to the sleep state clock source used in the sleep state.

In an aspect, the at least one processor is configured to determine that the at least one SFN hypothesis represents a current SFN in accordance with the clock source, when a value of the detection metric exceeds a threshold value.

In an aspect, the at least one processor is further configured to for the at least one SFN hypothesis, generate a Physical Broadcast Channel (PBCH) sequence.

In an aspect, the at least one processor is further configured to compare each coded bit in the generated PBCH sequence with a Log Likelihood Ratio (LLR) value representing a corresponding coded bit in the PBCH sequence received from the base station; flip a sign of the LLR value when the corresponding coded bit in the generated PBCH sequence is minus one; and after the comparing and flipping has been performed for all coded bits in the generated PBCH sequence, generate a value of the detection metric by adding the remaining LLR values.

Certain aspects of the present disclosure provide a computer-readable medium for wireless communication by a UE. The computer-readable medium generally stores instructions which when processed by at least one processor performs a method. The method generally includes determining one or more System Frame Number (SFN) hypotheses, each of the one or more SFN hypotheses representing a possible SFN at which the UE can wake up from a sleep state of a Discontinuous Reception (DRX) cycle. For at least one of the one or more SFN hypotheses a detection metric is generated based at least partially on a Physical Broadcast Control Channel (PBCH) sequence received from a base station; and the UE determines, based on a value of the detection metric, whether the at least one SFN hypothesis represents a current SFN in accordance with a clock source used by the base station for communicating with the UE. The UE determines, based on the at least one SFN hypothesis, a timing to be used for communicating with the base station, when the at least one SFN hypothesis is determined as representing the current SFN; and communicates with the base station based on the determined timing.

In an aspect, the computer-readable medium further includes instructions for determining a timing error related to a sleep state clock used by the UE in the sleep state of the DRX cycle, wherein the one or more SFN hypotheses is determined based at least one the timing error.

In an aspect, the timing error comprises a maximum timing error related to the sleep state clock source used in the sleep state.

In an aspect, determining whether the at least one SFN hypothesis represents a current SFN comprises determining that the at least one SFN hypothesis represents a current SFN in accordance with the clock source, when a value of the detection metric exceeds a threshold value.

In an aspect, the computer-readable medium further includes instructions for the at least one SFN hypothesis, generating a Physical Broadcast Channel (PBCH) sequence.

In an aspect, generating the detection metric includes comparing each coded bit in the generated PBCH sequence with a Log Likelihood Ratio (LLR) value representing a corresponding coded bit in the PBCH sequence received from the base station; flipping a sign of the LLR value when the corresponding coded bit in the generated PBCH sequence is minus one; and after the comparing and flipping has been performed for all coded bits in the generated PBCH sequence, generating a value of the detection metric by adding the remaining LLR values.

Certain aspects of the present disclosure provide a method for wireless communication by a User Equipment (UE). A sample method generally includes determining, for a System Frame Number (SFN) hypothesis, a detection metric based at least partially on a Physical Broadcast Control Channel (PBCH) sequence received from a base station, the SFN hypothesis representing a possible SFN at which the UE can wake up from the sleep state; determining, based on a value of the detection metric, whether the SFN hypothesis represents a current SFN in accordance with a clock source used by the base station for communicating with the UE; determining, based on the SFN hypothesis, a timing to be used for communicating with the base station, when the SFN hypothesis is determined as representing the current SFN; and communicating with the base station based on the determined timing.

In an aspect, the method further includes determining a timing error related to a sleep state clock source used by the UE in a sleep state of a Discontinuous Reception (DRX) cycle; and determining a plurality of System Frame Number (SFN) hypotheses based at least on the timing error, each of the plurality of SFN hypotheses representing a possible SFN at which the UE can wake up from the sleep state, wherein the SFN hypothesis is one of the plurality of SFN hypotheses In an aspect, the timing error comprises a maximum timing error related to the sleep state clock source used in the sleep state.

In an aspect, determining the timing error includes determining the timing error as a function of a timing offset error related to the sleep state clock source and a sleep duration of the sleep state, wherein a value of the timing error comprises a number of frames, and wherein the SFN hypothesis is a SFN hypothesis from a range of SFN hypotheses, wherein the range is a function of the value of the timing error.

In an aspect, determining whether the SFN hypothesis represents a current SFN includes determining that the SFN hypothesis represents a current SFN in accordance with the clock source, when a value of the detection metric exceeds a threshold value.

In an aspect, the method further includes generating, for the SFN hypothesis, a Physical Broadcast Channel (PBCH) sequence.

In an aspect, generating the detection metric includes comparing each coded bit in the generated PBCH sequence with a Log Likelihood Ratio (LLR) value representing a corresponding coded bit in the PBCH sequence received from the base station; flipping a sign of the LLR value when the corresponding coded bit in the generated PBCH sequence is minus one; and after the comparing and flipping has been performed for all coded bits in the generated PBCH sequence, generating a value of the detection metric by adding the remaining LLR values.

In an aspect, a PBCH payload corresponding to the generated PBCH sequence for the SFN hypothesis includes a first portion indicating an SFN corresponding to the SFN hypothesis and a second portion indicating other system information, wherein the SFN changes for only certain SFN hypotheses while the other system information remains the same.

In an aspect, generating the PBCH sequence for the SFN hypothesis includes

In an aspect, obtaining system information from a previous transmission of the PBCH; constructing a PBCH payload based on the obtained system information and the SFN corresponding to the SFN hypothesis; generating PBCH data by adding cyclic redundancy check (CRC) bits to the constructed PBCH payload; coding the generated PBCH data to generate coded PBCH data; and scrambling the coded PBCH data to generate the PBCH sequence.

In an aspect, the generating the PBCH data and the coding is performed every fourth SFN hypothesis, wherein mod (SFN,4)=0, and wherein the scrambling is performed for every SFN hypothesis.

In an aspect, the detection metric indicates a level of correlation between the generated PBCH sequence and the actual PBCH sequence, wherein a higher value of the metric indicates a higher level of correlation.

Certain aspects provide a method for wireless communication by a User Equipment (UE). A sample method generally includes determining a potential timing error related to a clock source used in the sleep state of a Discontinuous Reception (DRX) cycle; determining a number of System Frame Number (SFN) hypotheses based on the potential timing error, each SFN hypothesis representing a possible SFN at which the UE can wake up from the sleep state; and for each of the SFN hypothesis, generating a Physical Broadcast Channel (PBCH) sequence; generating a detection metric by comparing the generated PBCH sequence with an actual PBCH sequence received from a base station; and determining, based on a value of the detection metric, whether the SFN hypothesis represents a current SFN in accordance with a correct clock source.

Certain aspects provide an apparatus for wireless communication by a User Equipment (UE). A sample apparatus generally includes at least one processor and a memory coupled to the at least one processor. The at least one processor is generally configure to determine a potential timing error related to a clock source used in the sleep state of a Discontinuous Reception (DRX) cycle; determine a number of System Frame Number (SFN) hypotheses based at least on the potential timing error, each SFN hypothesis representing a possible SFN at which the UE can wake up from the sleep state; and for each of the SFN hypothesis: generate a Physical Broadcast Channel (PBCH) sequence; generate a detection metric by comparing the generated PBCH sequence with an actual PBCH sequence received from a base station; and determine, based on a value of the detection metric, whether the SFN hypothesis represents a current SFN in accordance with a correct clock source.

Certain aspects provide an apparatus for wireless communication by a User Equipment (UE). An example apparatus generally includes means for determining a potential timing error related to a clock source used in the sleep state of a Discontinuous Reception (DRX) cycle; means for determining a number of System Frame Number (SFN) hypotheses based at least on the potential timing error, each SFN hypothesis representing a possible SFN at which the UE can wake up from the sleep state; and means for performing for each of the SFN hypothesis: generating a Physical Broadcast Channel (PBCH) sequence; generating a detection metric by comparing the generated PBCH sequence with an actual PBCH sequence received from a base station; and determining, based on a value of the detection metric, whether the SFN hypothesis represents a current SFN in accordance with a correct clock source Certain aspects provide a computer-readable medium for wireless communication by a User Equipment (UE). A sample computer-readable medium generally stores instructions which when processed by at least one processor performs a method. The method generally includes determining a potential timing error related to a clock source used in the sleep state of a Discontinuous Reception (DRX) cycle; determining a number of System Frame Number (SFN) hypotheses based on the potential timing error, each SFN hypothesis representing a possible SFN at which the UE can wake up from the sleep state; and for each of the SFN hypothesis, generating a Physical Broadcast Channel (PBCH) sequence; generating a detection metric by comparing the generated PBCH sequence with an actual PBCH sequence received from a base station; and determining, based on a value of the detection metric, whether the SFN hypothesis represents a current SFN in accordance with a correct clock source.

Aspects of the present disclosure provide means for, apparatus, processors, and computer-readable mediums for performing techniques and methods that may be complementary to UE operations described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments such exemplary embodiments can be implemented in varying shapes, sizes, layouts, arrangements, circuits, devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 illustrates an example table showing a number of SFN hypotheses and corresponding number of maximum turbo coding instances for different timing errors and maximum timing error values, in accordance with aspects of the present disclosure.

FIG. 9 illustrates an example table showing a comparison between a baseline (e.g., currently existing) scheme and the proposed scheme for PBCH detection, in accordance with aspects of the present disclosure.

Figure 1:
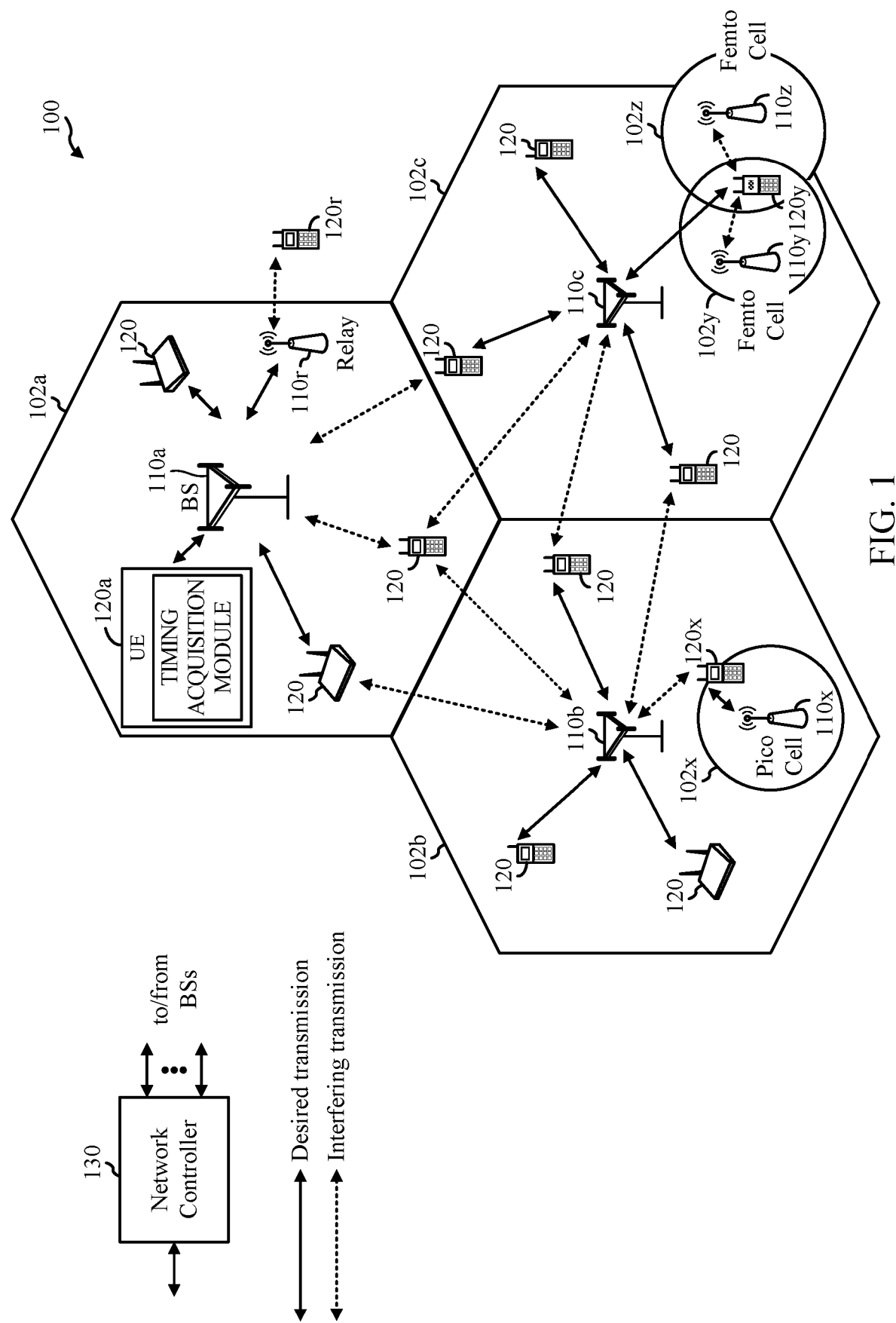
FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements disclosed in one aspect, figures, or embodiments may be beneficially utilized on others without specific recitation.

DETAILED DESCRIPTION

Aspects of the present disclosure provide apparatus, methods, processing systems, and computer readable mediums fast timing acquisition in a variety of scenarios (e.g., Enhanced DRX (eDRX)).

Certain aspects of the present disclosure discuss a technique for faster correction of timing offset errors upon DRX wakeup. Such techniques may aid in timing corrections by hypothesizing PBCH payloads over a number of SFN hypotheses determined based on a potential timing error as a result of a sleep state clock source.

In an aspect, faster correction of timing offset errors allows for a shorter modem warmup time allowing the UE to wakeup closer in time to an expected paging occasion, thus saving modem power. In an aspect, the discussed techniques are beneficial for longer DRX cycles and low SNR applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). In certain aspects, a UE 120a includes a timing acquisition module configured to perform certain aspects of the techniques discussed herein with respect to a UE.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
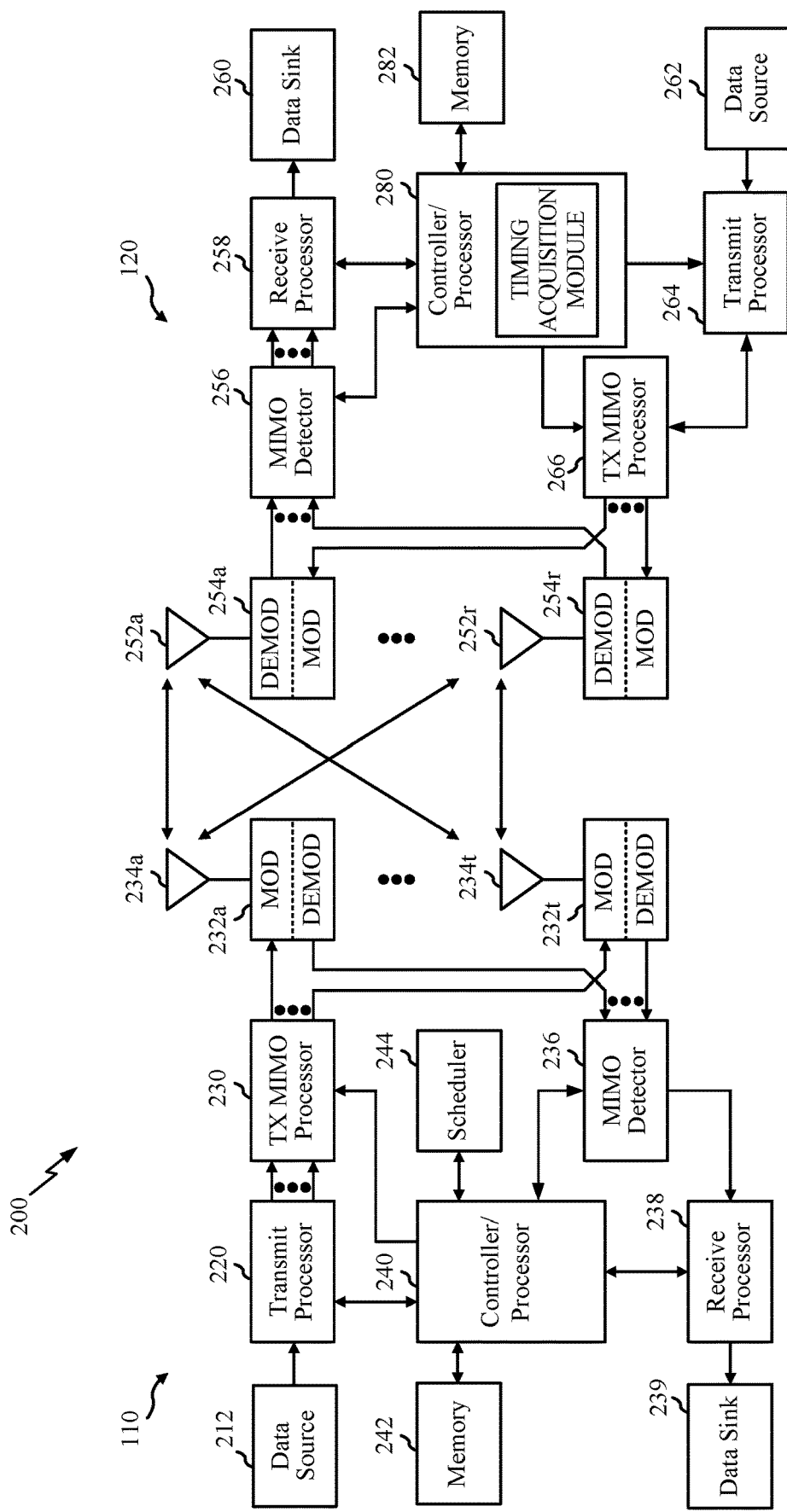
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, in certain aspects, controller/processor 280 includes a timing acquisition module configured to perform certain aspects of the techniques discussed herein with respect to a UE.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
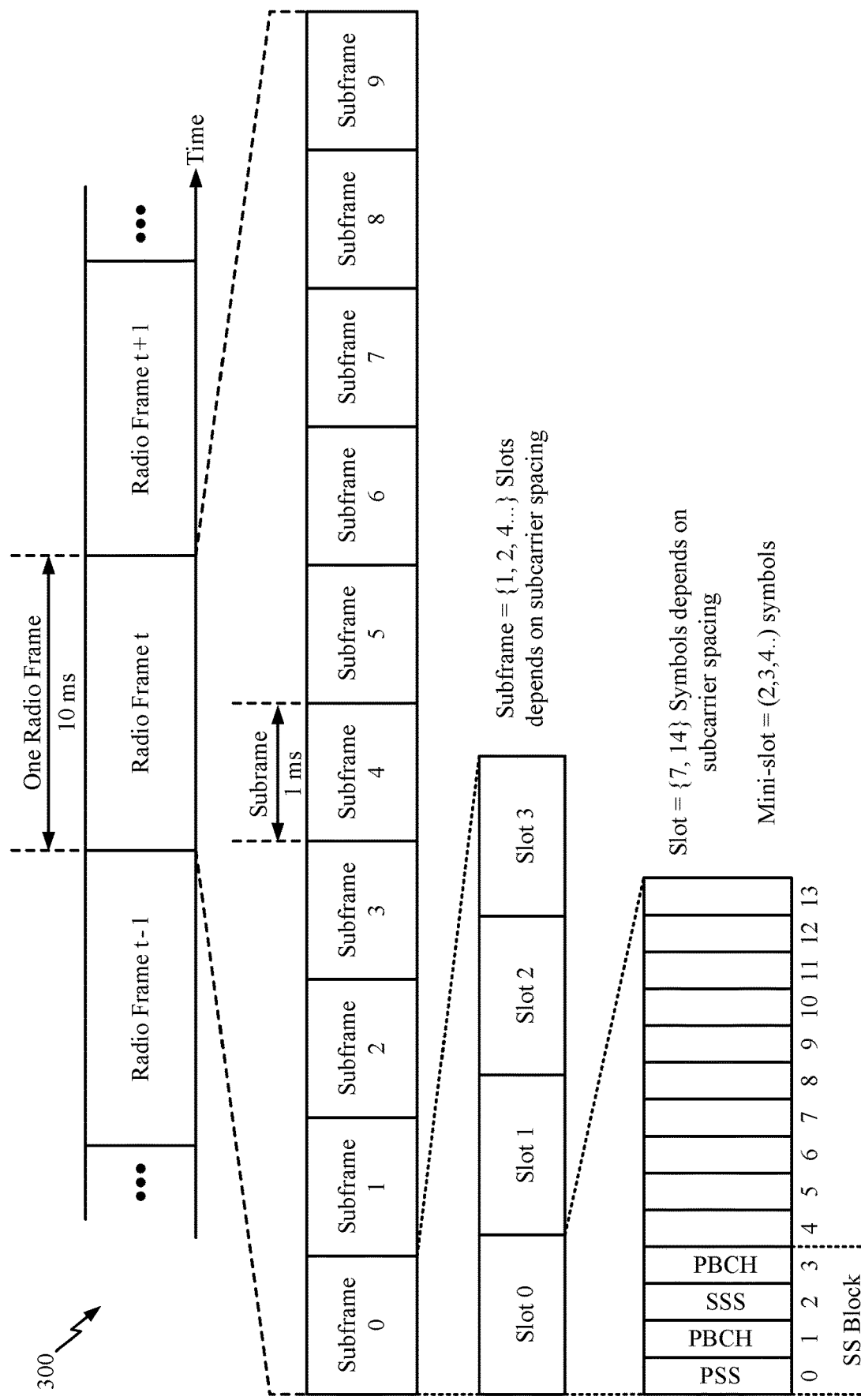
FIG. 3 is a diagram showing an example of a frame format for NR in accordance with certain aspects of the present disclosure.

FIG. 3 is a diagram showing an example of a frame format 300 for NR. The transmission timeline for each of the downlink and uplink may be partitioned into units of radio frames. Each radio frame, represented by a system frame number (SFN), may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched.

The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Timing Acquisition in DRX (eDRX)

Extended Discontinuous Reception (eDRX) with longer sleep cycles was introduced in $3^{rd}$ Generation Partnership Project (3GPP) Rel.13. eDRX cycles generally include up to 10.24 secs in connected mode and up to 43.69 minutes in idle mode (also referred to as sleep state). A UE modem generally goes to sleep between DRX wakeups in order to save power.

UE modems generally use a low accuracy clock during eDRX sleep states. Thus, UE modems generally drift in time and frequency accuracy during the sleep state, which results in a frequency offset (FO) error and/or a timing offset (TO) error when the UE wakes up from a sleep state.

For example, if the frequency offset error of a sleep state clock is 1 ppm, for a carrier frequency fc=2.4 GHz, the frequency offset at wakeup is about 2.4 KHz on either side of the actual carrier frequency (fc).

Further, if the timing offset error of the sleep state clock is 10 ppm, for sleep duration of 10.24*128 secs, the timing offset at wakeup is about 12.8 ms on either side of the expected wakeup time.

In order to correct the frequency offset and timing offset, the UE modem generally wakes up delta time (DT) ahead of an expected paging occasion (PO). In an aspect, DT represents a modem warmup duration which includes time required by the modem to resolve the error and acquire the correct timing to receive a page from the network. For example, the UE wakes up a certain number of frames before the frame in which it expects to receive a page from the network, in order to allow the UE modem sufficient time to acquire the correct timing.

Figure 4:
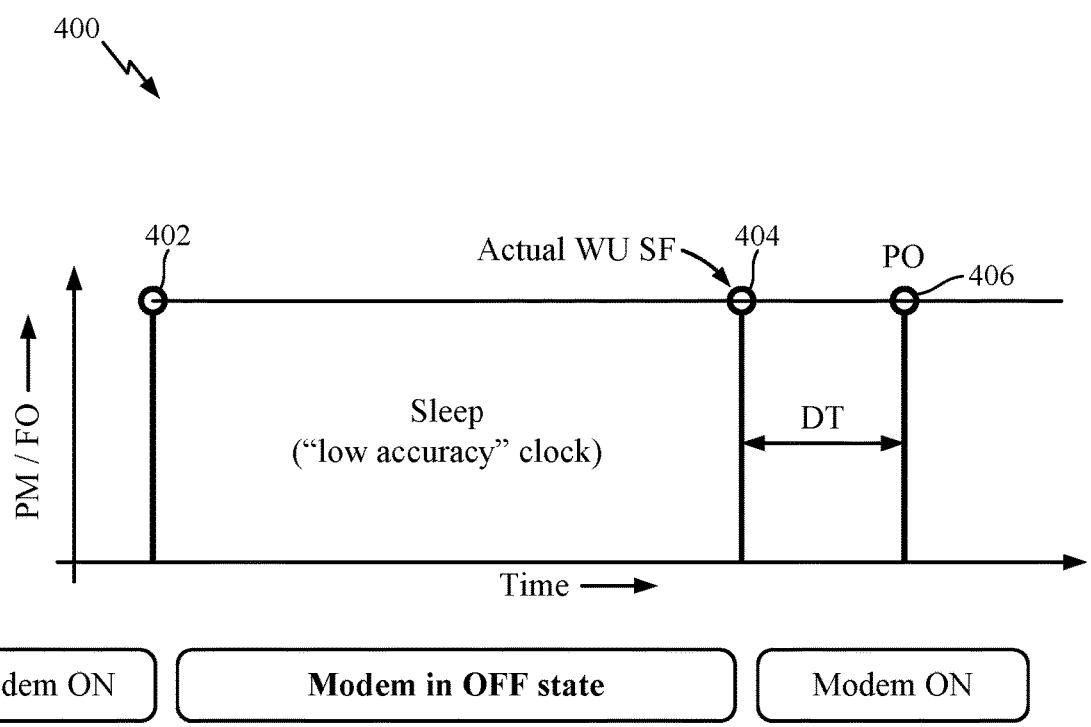
FIG. 4 illustrates an exemplary timing acquisition upon wakeup from a eDRX sleep state, in accordance with certain aspects of the present disclosure.

FIG. 4 illustrates an exemplary timing acquisition 400 upon wakeup from a eDRX sleep state, in accordance with certain aspects of the present disclosure.

As shown in FIG. 4, the UE modem is in a DRX sleep state between time instants 402 and 404. PO represents a paging opportunity expected by the UE at time instant 406. As shown, the modem wakes up at time instant 404, which is DT duration ahead of the PO to allow the UE time to correct any timing error as a result of the low accuracy clock reference used during the sleep state.

In certain aspects, power consumption of the UE modem heavily depends on the warmup duration, DT of the modem. Thus, it is desirable that the modem warmup time is as short as possible to save power consumption so that the UE wakes up from a sleep state as close as possible to the paging occasion.

Certain aspects of the present disclosure discuss a technique for faster correction of timing offset errors upon DRX wakeup, by hypothesizing PBCH payloads over a number of SFN hypotheses determined based on a potential timing error as a result of a sleep state clock source.

In an aspect, faster correction of timing offset errors allows for a shorter modem warmup time allowing the UE to wakeup closer in time to an expected paging occasion, thus saving modem power. In an aspect, the discussed techniques are beneficial for longer DRX cycles and low SNR applications.

It may be noted that while techniques for fast timing offset correction and acquisition are discussed in the present disclosure with reference to eDRX, these techniques are equally applicable to DRX.

The PBCH is broadcasted by a base station and includes the Master Information Block (MIB). The PBCH generally includes a 24 bit PBCH payload (e.g., MIB payload) and 16 bits for cyclic redundancy check (CRC) for a total of 40 PBCH bits. The 24 bit PBCH payload generally includes 8 bits for SFN indication and 16 bits for other system information. The PBCH is transmitted once every frame (10 msec).

When generating PBCH at a base station, a 16 bit CRC is generated and the generated CRC is attached to the PBCH/MIB payload after which the size of the payload is 40 bits (24 bit of MIB+16 bit of CRC). Tail-Bit Convolution Encoding (TBCC) is performed over the 40 bits and the output is 3 streams of 40 bits each (a total of 120 bits). Rate matching is performed which includes repetition coding, where the 3 streams of size 120 bits (40×3 bits) is repeated 16 times to get 1920 bits. The repetition rate is very high since the MIB is vital information and the UE cannot afford to lose it. These 1920 bits are scrambled with a scrambling sequence. Finally, QPSK modulation is performed over these 1920 bits to obtain 960 complex QPSK symbols.

In an aspect, the scrambling sequence used for generating the PBCH sequence changes every SFN. However, the 24 bit PBCH payload remains constant for four consecutive frames or SFNs (a duration of 40 ms). That is the PBCH payload changes every four frames or 40 ms. In an aspect, only the eight MSB bits of the 24 bit PBCH payload changes every four frames or 40 ms as the SFN increments every four frames. The remaining 16 bit system information of the PBCH payload is not expected to change at all.

At a receiving UE, the PBCH is conventionally decoded using combining and TBCC decoding using Viterbi's algorithm or other algorithm. At lower SNRs PBCH payloads are combined over multiple TTIs (e.g., TTI=40 ms) to achieve successful decoding.

In certain aspects, as discussed in the following paragraphs, the fact that the 8 SFN bits of the PBCH payload changes every four SFNs and that the 16 system information bits are not expected to change may be leveraged to hypothesize PBCH payloads for different SFN hypotheses. This may allow a UE to quickly resolve any timing error when the UE wakes up after a DRX sleep cycle.

Figure 5A:
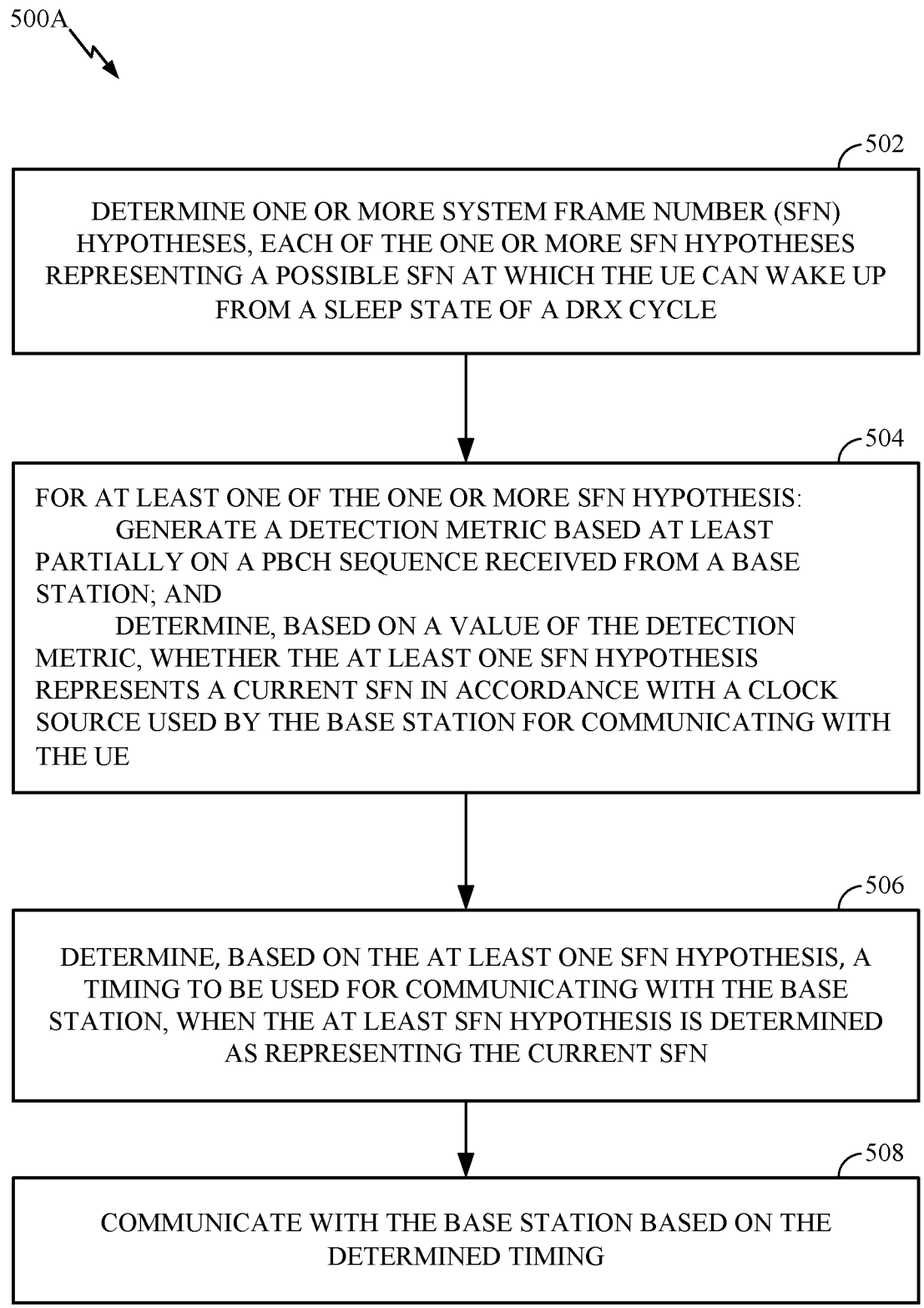
FIG. 5A illustrates example operations performed by a UE (e.g., UE modem) for fast timing acquisition upon wake up after a sleep state in DRX, in accordance with certain aspects of the present disclosure.

FIG. 5A illustrates example operations 500A performed by a UE (e.g., UE modem) for fast timing acquisition upon wake up after a sleep state in DRX, in accordance with certain aspects of the present disclosure.

Operations 500A begin, at 502, by determining one or more SFN hypotheses. In some cases, each of the one or more SFN hypotheses represents a possible SFN at which the UE can wake up from a sleep state of a DRX cycle (e.g., eDRX cycle). A number of individual SFN hypotheses can be grouped into a set of SFN hypotheses. In an aspect, the UE determines a timing error related to a sleep state clock source used by the UE in the sleep state of the DRX cycle. The UE determines the one or more SFN hypotheses based at least on the timing error. In an aspect, the timing error is a maximum timing error associated with the sleep state clock source. As mentioned above, a UE's clock may drift while in a sleep state. This drift can cause communication challenges and concerns. Determination of potential timing errors helps to resolve issues associated with clock drift. In an aspect, the timing error is a maximum timing error associated with the sleep state clock source.

At 504, for at least one of the one or more SFN hypotheses, the UE generates a detection metric based least partially on a PBCH sequence received from a base station. The UE further determines, based on a value of the detection metric, whether the at least one SFN hypothesis represents a current SFN in accordance with a clock source used by the base station for communicating with the UE. In an aspect, for the at least one SFN hypothesis, the UE generates a Physical Broadcast Channel (PBCH) sequence. The UE generates the detection metric for the at least one SFN hypothesis by comparing the generated PBCH sequence with the PBCH sequence received from the base station. In an aspect, the UE determines that the at least one SFN hypothesis represents a current SFN in accordance with the second clock source, when the value of the detection metric exceeds a threshold value.

At 506, the UE determines, based on the at least one SFN hypothesis, a timing to be used for communicating with the base station, when the at least one SFN hypothesis is determined as representing the current SFN.

At 508, the UE communicates with the base station based on the determined timing.

Figure 5B:
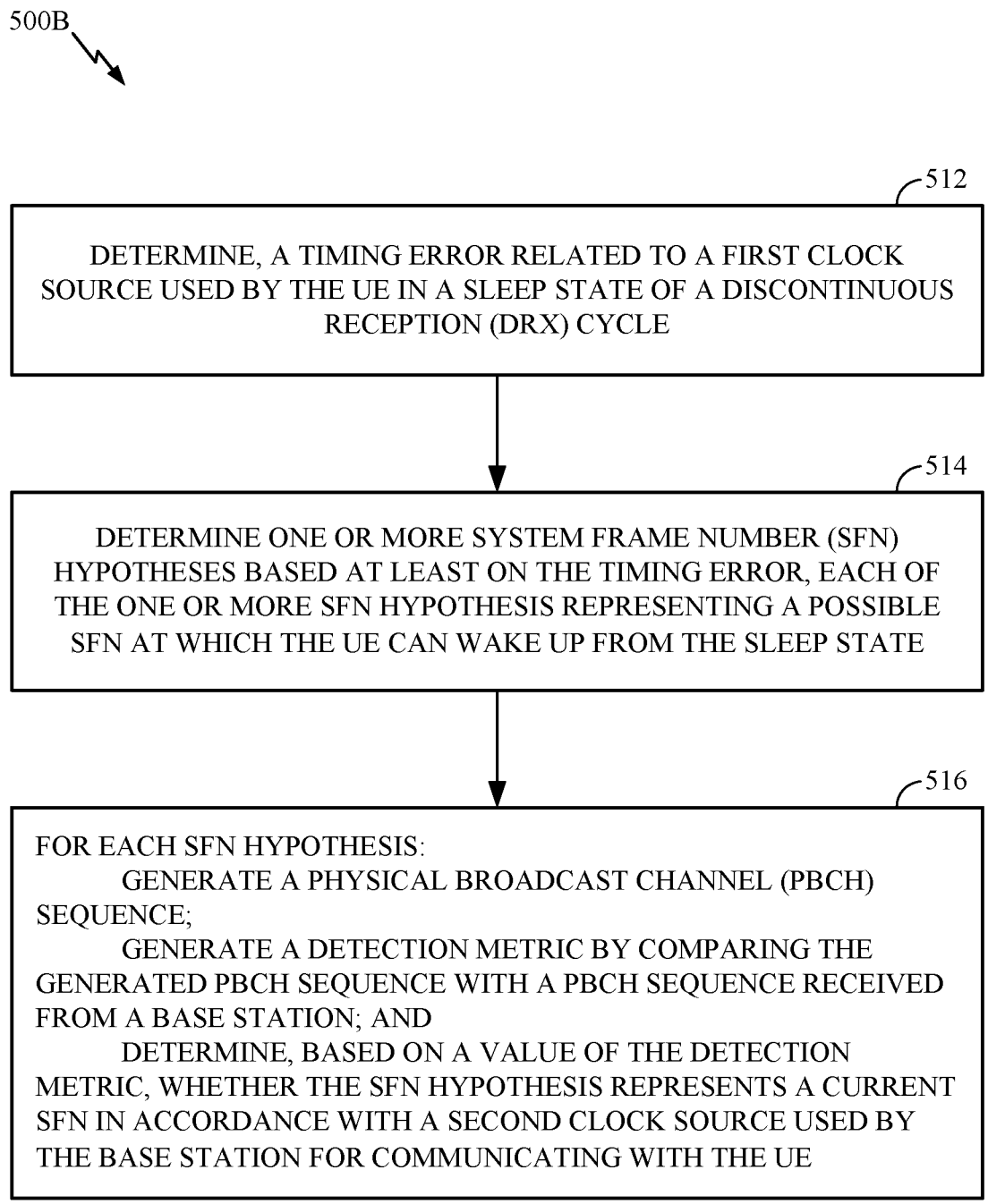
FIG. 5B illustrates another set of example operations performed by a UE (e.g., UE modem) for fast timing acquisition upon wake up after a sleep state in DRX, in accordance with certain aspects of the present disclosure.

FIG. 5B illustrates another set of example operations 500B performed by a UE (e.g., UE modem) for fast timing acquisition upon wake up after a sleep state in DRX, in accordance with certain aspects of the present disclosure.

Operations 500B begin, at 512, by determining a timing error related to a first clock source used by the UE in a sleep state of a DRX cycle (e.g., eDRX). As mentioned above, a UE's clock may drift while in a sleep state. This drift can cause communication challenges and concerns. Determination of potential timing errors helps to resolve issues associated with clock drift. In an aspect, the timing error is a maximum timing error associated with the sleep state clock source.

At 514, the UE determines one or more SFN hypotheses based at least one on the timing error. In some cases, each of the one or more SFN hypotheses can represent a possible SFN at which the UE can wake up from the sleep state. A number of individual SFN hypotheses can be grouped into a set of SFN hypotheses.

At 516, for at least one SFN hypothesis, the UE generates a PBCH sequence, and generates a detection metric by comparing the generated PBCH sequence with an actual PBCH sequence received from a base station. The UE determines, based on a value of the detection metric, whether the at least one SFN hypothesis represents a current SFN in accordance with a second clock source used by the base station for communicating with the UE. In an aspect, as discussed in the following paragraphs, the UE acquires the correct timing (e.g., timing in accordance with the second clock source) based on evaluating the detecting metric generated for one or more SFN hypotheses. For instance, when the UE determines that the detection metric generated for a particular SFN hypothesis exceeds a threshold value, the UE determines that the SFN of the particular SFN hypothesis is according to the correct timing (e.g., based on the second clock source). The UE then adjusts its own clock reference based on the timing of the particular SFN hypothesis.

Figure 5C:
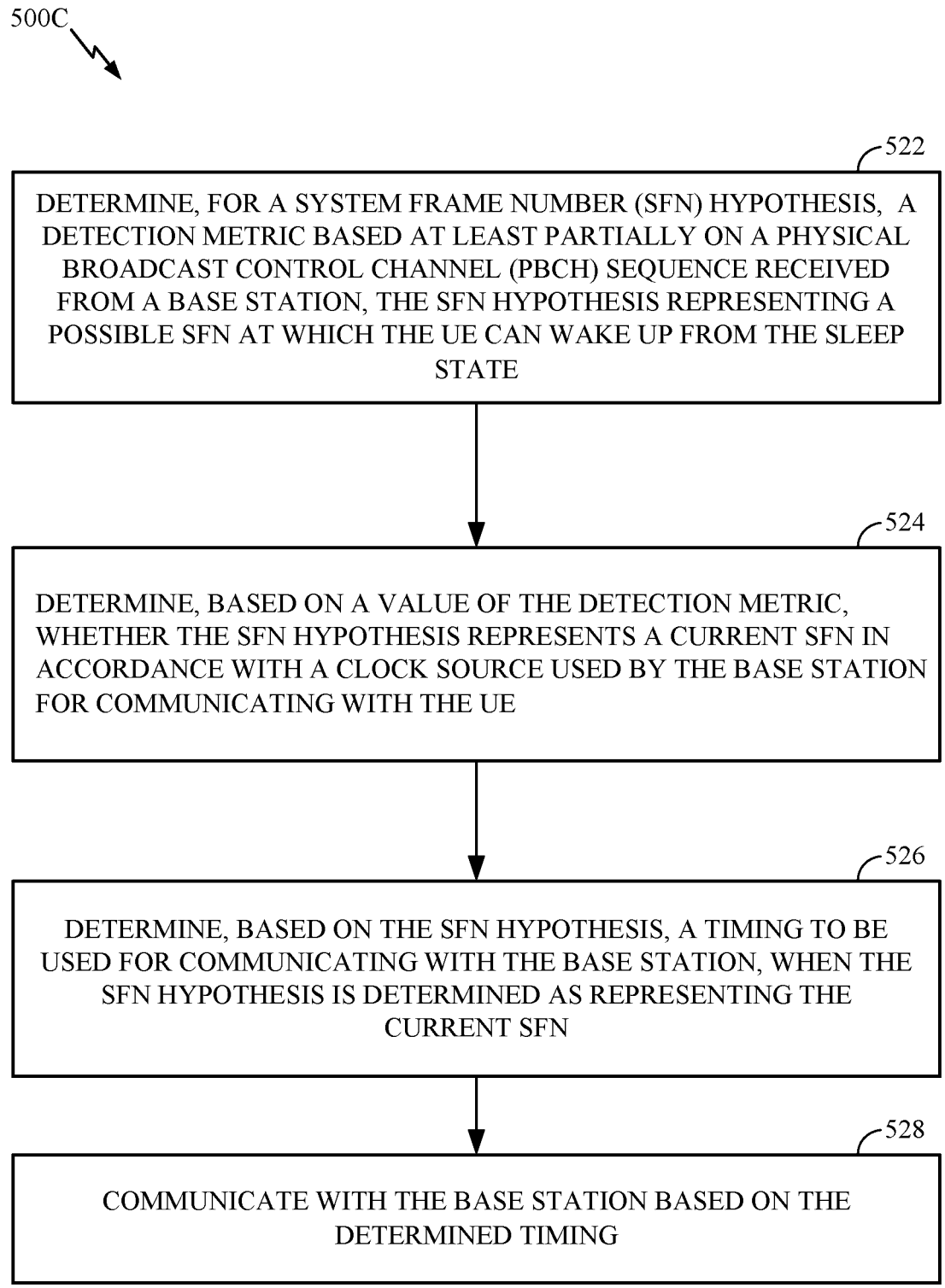
FIG. 5C illustrates another set of example operations performed by a UE (e.g., UE modem) for fast timing acquisition upon wake up after a sleep state in DRX, in accordance with certain aspects of the present disclosure.

FIG. 5C illustrates another set of example operations 500C performed by a UE (e.g., UE modem) for fast timing acquisition upon wake up after a sleep state in DRX, in accordance with certain aspects of the present disclosure.

Operations 500C begin, at 522, by determining, for a SFN hypothesis, a detection metric based at least partially on a PBCH sequence received from a base station, the SFN hypothesis representing a possible SFN at which the UE can wake up from the sleep state. In an aspect, the UE determines a timing error related to a sleep state clock source used by the UE in the sleep state of the DRX cycle. The UE determines the SFN hypothesis based at least on the timing error. In an aspect, the timing error is a maximum timing error associated with the sleep state clock source. As mentioned above, a UE's clock may drift while in a sleep state. This drift can cause communication challenges and concerns. Determination of potential timing errors helps to resolve issues associated with clock drift. In an aspect, the timing error is a maximum timing error associated with the sleep state clock source At 524, the UE determines, based on a value of the detection metric, whether the SFN hypothesis represents a current SFN in accordance with a clock source used by the base station for communicating with the UE.

At 526, the UE determines based on the SFN hypothesis, a timing to be used for communicating with the base station, when the SFN hypothesis is determined as representing the current SFN.

At 528, the UE communicates with the base station based on the determined timing.

In certain aspects, if PO denotes the system frame number at which the UE is expecting to receive a transmission from the base station, the modem generally needs to wake up at a system frame number SF_wu ahead of the PO, where SF_wu is given as, $$SF\_wu = PO - D\_init - D\_sfn - N\max$$

where Nmax is the maximum expected timing error in terms of number of radio frames. In an aspect, the UE determines the Nmax as a function of ppm clock error of the sleep state clock source and a sleep duration of the eDRX cycle. In an aspect, the ppm error dictates how much earlier from the PO the UE needs to wake up. For example, the higher is the ppm error, the earlier the UE needs to wake up.

D_init is the time required for modem initial wakeup procedures including time required for PSS/SSS detection.

D_sfn represents the delay in acquiring the correct timing (e.g., using PBCH detection). In an aspect, the UE determines the D_sfn as a function of the sleep duration of the eDRX cycle, SNR and expected time to correct the timing error and acquire the correct timing. In an aspect, the faster the UE expects to acquire the correct timing, the shorter is D_sfn and the later the UE can wake up ahead of the PO, which as described earlier translates to power savings.

Figure 6:
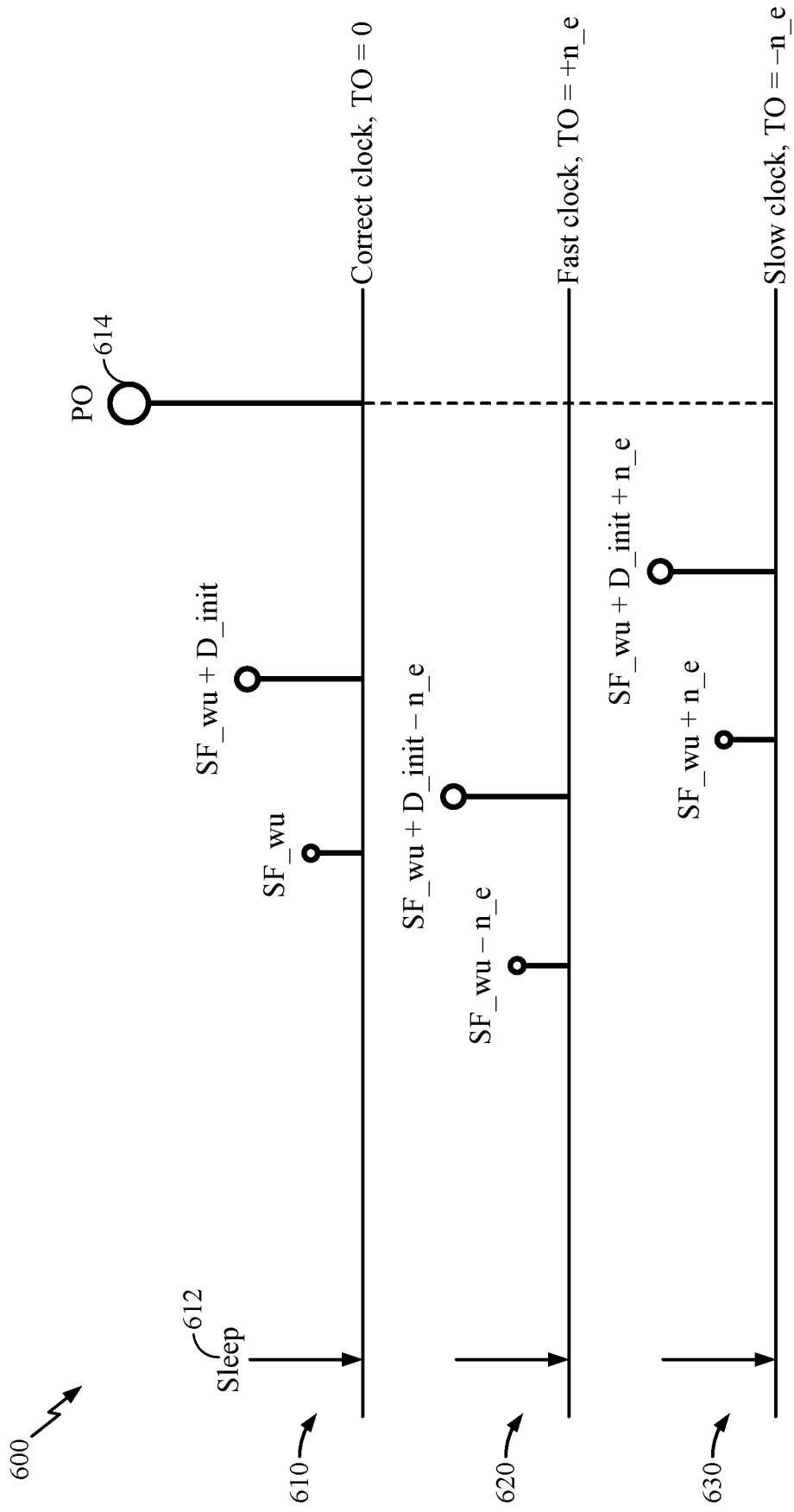
FIG. 6 illustrates actual UE wake up times after a sleep state sleep state for different clock references, in accordance with aspects of the present disclosure.

FIG. 6 illustrates actual UE wake up times after sleep state for different clock references, in accordance with aspects of the present disclosure. The illustrated wake up times may correspond to either DRX or eDRX scenarios. As shown, there are various example timelines showing a variety of clock scenarios for a UE: 610 represents a timeline corresponding to a correct clock, 620 represents a timeline corresponding to a fast clock, and 630 represents a timeline corresponding to a slow clock. As shown, the UE sleeps at time instant 612. The UE expects to receive a page from the network at PO 614.

As shown with reference to timeline 610, in accordance with a correct clock reference (TO=0 ms), the UE wakes up at SF_wu (SF_wu=PO−D_init−D_sfn−Nmax), and is expected to be at "SF_wu+Dinit" after performing the modem initial wakeup procedures. In an aspect, if the clock is correct with no timing offset error (e.g., according to timeline 610), the UE at "SF_wu" and at "SF_wu+Dinit" is at the correct corresponding SFNs it expects to be at.

Yet if there is a timing offset error, the UE may awake at an improper timing. For example, a UE may wake up at an SFN which is not the SFN the UE is expecting to wake up at. For example, if the sleep state clock reference has a positive time offset, the sleep state clock runs faster than the correct clock and the UE will actually wake up earlier than it expects to wake up. As shown with reference to timeline 620, in accordance with a fast clock with a positive actual timing error of "+n_e", the UE actually wakes up at "SF_wu−n_e" which is n_e earlier than the SFN "SF_wu" the UE expects to wake up at, and the UE is actually at "SF_wu+Dinit−n_e" after initial wakeup procedures which is also n_e earlier than "SF_wu+Dinit" the UE is expected to be at. Similarly, if the sleep state clock reference has a negative time offset, the sleep state clock runs slower than the correct clock and the UE will actually wake up later than it expects to wake up. As shown with reference to timeline 630, in accordance with a slow clock with a negative actual timing error of "−n_e", the UE actually wakes up at "SF_wu+n_e" which is n_e later than the SFN "SF_wu" the UE expects to wake up at, and the UE is actually at "SF_wu+Dinit+n_e" after initial wakeup procedures which is also n_e later than "SF_wu+Dinit" the UE is expected to be at.

In an aspect, when the UE wakes up at an improper SFN, the UE may take appropriate action. For example, when a UE awakes at an SFN that is not the SFN the UE is expecting to wake up at (e.g., as a result of a clock error), the UE needs to determine the SFN of the frame it actually woke up at in order to acquire the correct timing with respect to the correct clock reference. Determination of a correct awakening SFN by the UE may help a UE take action to align or re-align to proper timing for quality communication purposes.

As may be inferred from the above discussion with reference to FIG. 6, given that n_e is the actual TO error, the UE, when attempting to wakeup at SF_wu may actually wakeup at any time instant between "SF_wu−n_e" and "SF_wu+n_e". The actual timing error n_e may take a maximum value of Nmax (e.g., +Nmax or −Nmax depending on whether the UE clock is faster or slower respectively). Thus, after frame boundary acquisition using PSS/SSS, the UE may wakeup at any SFN between "SF_wu+D_init−Nmax" and "SF_wu+D_init+Nmax". That is the SFN, after initial wakeup procedures are completed, is bounded by ["SF_wu+D_init−Nmax", "SF_wu+D_init+Nmax"].

So, the uncertainty in SFN upon wakeup is (2*Nmax+1) SFN values. In an aspect, for eDRX, since the only factor of the 24 bit PBCH payload that changes is the 8 bit SFN, the uncertainty in the PBCH payload upon wake up is also (2*Nmax+1) values. That is, if the UE starts acquiring SFN information at any SFN between "SF_wu+D_init−Nmax" and "SF_wu+D_init+Nmax", the PBCH payload at that SFN can take (2*Nmax+1) values.

In certain aspects, the UE, upon waking up from an eDRX sleep state (e.g., after initial wakeup procedures, for e.g., D_init), may hypothesize the PBCH payload over (2*Nmax+1) SFN hypotheses, in order to determine the actual SFN the UE woke up at and thus acquire the correct timing. For example, the UE, upon wakeup from an eDRX sleep state (e.g., after initial wakeup procedures), may hypothesize the PBCH payload over (2*Nmax+1) SFN hypotheses from "SF_wu+D_init−Nmax" to "SF_wu+D_init+Nmax". Once the UE determines the PBCH payload corresponding to the SFN the UE is actually positioned at on the timeline (e.g., based on the hypothesizing the PBCH payloads), the UE can determine the SFN number of the frame the UE is positioned at based on the 8 MSB bits of the PBCH payload. The UE then knows its position on the timeline according to the correct clock reference.

In some scenarios, if the UE attempts to decode the PBCH payload upon waking up from a sleep state using the conventionally used method (e.g., TBCC decoding using Viterbi's algorithm), the UE may have to decode the entire convolutional code which has $2^{40}$ codewords. Hypothesizing the PBCH payload over only (2*Nmax+1) possibilities as discussed herein is significantly less than attempting to decode $2^{40}$ codewords. Detecting the PBCH payload by hypothesizing over a significantly lower number of possibilities in accordance with aspects of the present disclosure results in a reliable and quick PBCH detection.

Figure 7:
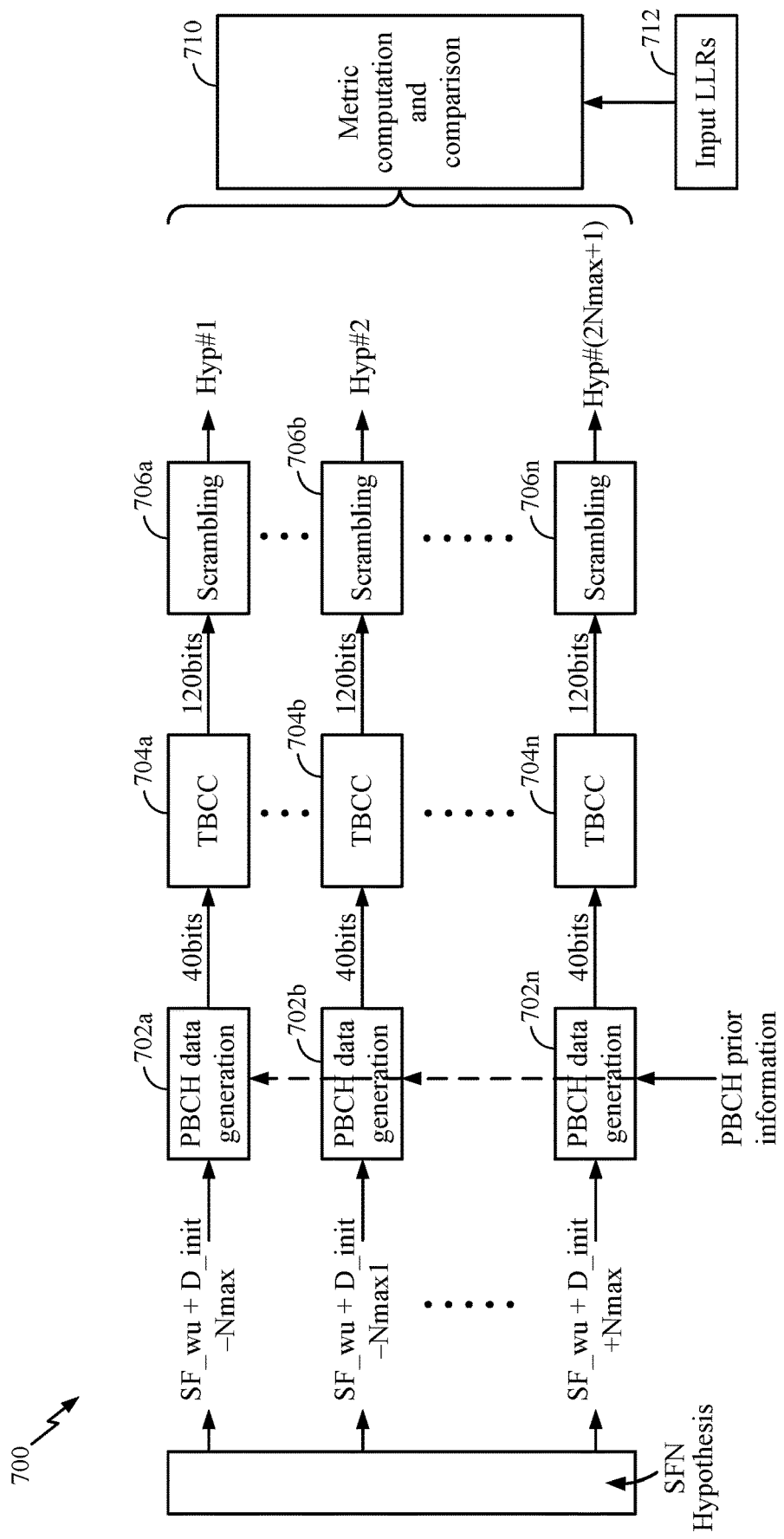
FIG. 7 illustrates an example block diagram for fast PBCH detection, in accordance with certain aspects of the present disclosure.

FIG. 7 illustrates an example block diagram 700 for fast PBCH detection, in accordance with certain aspects of the present disclosure. In an aspect, the operations described herein with reference to block diagram 700 may be implemented by the timing acquisition module of the controller/processor 280 of the UE 120 as shown in FIG. 2.

As shown in FIG. 7, block diagram 700 generates a PBCH sequence for each of the (2*Nmax+1) consecutive SFN hypotheses. In an aspect, the generation of the PBCH sequence for each SFN hypothesis is similar to how the PBCH sequence is generated by a base station for broadcasting in a cell.

In an aspect, when the UE wakes up from an eDRX sleep state at a particular SFN, the UE obtains the values of SF_wu, D_init and Nmax. The UE may calculate these values as discussed in the above paragraphs. In an aspect, these calculations may be performed by the controller/processor 280 of UE 120 as shown in FIG. 2. The UE then generates a PBCH sequence for each SFN hypothesis from "SF_wu+D_init−Nmax" to "SF_wu+D_init+Nmax".

As shown in FIG. 7, the PBCH sequence generation for each SFN hypothesis includes PBCH data generation (702a-702n), TBCC coding (704a-704n) and scrambling (706a-706n). PBCH data generation 702 includes constructing the 24 bit PBCH/MIB payload based on PBCH prior information. In an aspect, the PBCH prior information includes the known 16 bit system information of the 24 bit payload and the fact that the 16 bit system information remains unchanged. In an aspect, generating PBCH data for a particular SFN hypothesis includes appending the known 16 bit system information to the 8 bit SFN of the SFN hypothesis, and then attaching a 16 bit CRC to the 24 bit payload to generate 40 bits of PBCH data.

As shown in FIG. 7, for each SFN hypothesis, the 40 bit PBCH data is then TBCC encoded at 704 to generate a 120 bit PBCH sequence. The 120 bit PBCH sequence is then scrambled at 706 to generate a scrambled PBCH sequence.

As noted in the above paragraph, the PBCH payload changes only every four SFNs. Thus, the PBCH data generation 702 and the TBCC encoding needs to be performed only every four consecutive SFN hypotheses. This further reduces processing at the UE resulting in additional power savings. However, the scrambling sequence changes every SFN and thus the scrambling needs to be performed for every SFN hypothesis.

FIG. 8 illustrates an example table 800 showing a number of SFN hypotheses and corresponding number of maximum turbo coding instances for different timing errors and maximum timing error values, in accordance with aspects of the present disclosure.

Column 802 shows example clock timing errors in milli seconds, column 804 shows Nmax corresponding to each of the timing errors, column 806 shows a number of SFN hypotheses for each Nmax (calculated as (2*Nmax+1)) and column 808 shows the maximum number of TBCC coding instances for a corresponding number of hypotheses. As shown in table 800, for each value of Nmax, the number of TBCC coding instances is less than the number of SFN hypotheses, indicating that TBCC coding need not be performed for every SFN hypothesis.

In an aspect, for each SFN hypothesis i, the metric computation and comparison block calculates a detection metric ($d_i$) for the generated scrambled PBCH sequence, wherein the detection metric ($d_i$) detects the PBCH payload by evaluating a correlation of the bit stream of the scrambled PBCH sequence with input LLRs 712 received in the frame identified by the SFN of the SFN hypothesis, the LLRs corresponding to a coded PBCH bit stream received by the UE in the frame identified by the SFN of the SFN hypothesis.

In an aspect, the detection metric $d_i$ for an SFN hypothesis i is calculated as, $$d_i = \text{sum}(\text{flip}(LLR, c_i)),$$

where,

LLR denotes input LLR vector received at SFN i from the base station and represents the actual PBCH coded bit stream at SFN i, $c_i$ denotes the generated scrambled coded bits corresponding to SFN hypothesis i, the function flip(.) denotes flipping the signs of elements of $LLR_i$ if the corresponding elements of $c_i$ is equal to minus one, the function sum (.) denotes sum of all the elements of a vector.

In an aspect, the flip(LLR,$c_i$) function compares the input LLR vector with the generated PBCH coded bit stream, and flips the sign of an LLR value (e.g., '+1' to '−1' or '−1' to '+1') if the corresponding $c_i$ coded bit is '−1'. On the other hand, the function keeps the sign of an LLR value unchanged if the corresponding $c_i$ coded bit is '+1'. As an example, if an LLR value is '+1' and the corresponding $c_i$ coded bit is '−1', the flip(.) function flips the sign of the LLR value to '−1'. However, if the $c_i$ coded bit is '+1', the LLR value is left unchanged. Once the flip(.) function has been executed, the remaining LLR values are added by the sum (.) function.

Thus, the sum(flip(LLR,$c_i$) function determines how closely correlated the generated $c_i$ coded bits are to the actual PBCH coded bits for the SFN i by comparing the input LLR vector corresponding to the actual PBCH coded bits with the generated $c_i$ coded bits. A higher value of the detection metric $d_i$ indicates a higher correlation between the $c_i$ coded bits with the actual PBCH coded bits for the SFN i. On the other hand a lower value of the detection metric $d_i$ indicates that a lower correlation between the $c_i$ coded bits with the actual PBCH coded bits for the SFN i.

For example, assuming that the LLR vector is (+1, +1, −1, −1, +1, +1) and the $c_i$ is (+1, +1, −1, −1, +1, +1). Since the third and fourth values of the $c_i$ bits is '−1', the signs of the corresponding third and fourth LLR values will be flipped. Thus, the values of the LLR vector after the flip(.) function has been executed is (+1, +1, +1, +1, +1, +1). Adding these values results in $d_i$=6. The high value of $d_i$ shows that the generated $c_i$ bits and the actual PBCH coded bits received at SFN i are highly correlated. In another example, assuming that the LLR vector is (+1, +1, −1, −1, +1, +1) and the $c_i$ is (+1, +1, −1, −1, −1, −1). Since the third, fourth, fifth and sixth values of the $c_i$ bits is '−1', the signs of the corresponding third, fourth, fifth and sixth LLR values will be flipped. Thus, the values of the LLR vector after the flip(.) function has been executed is (+1, +1, +1, +1, −1, −1). Adding these values results in $d_i$=2 The lower value of $d_i$ shows that the generated $c_i$ bits and the actual PBCH coded bits received at SFN i are not as highly correlated. It may be noted that the lengths of the input LLR vector and the $c_i$ bit stream in the above examples has been selected for ease of explanation, and do not represent the actual lengths of either vectors.

In an aspect, the UE starts PBCH detection at SFN hypothesis "SF_wu+D_init−Nmax" and calculates the detection metric $d_i$ for each SFN hypothesis i. The UE stops the detection once detection metric $d_i$ for a particular SFN hypothesis exceeds a threshold value, and the SFN i corresponding to the winning SFN hypothesis is determined as the actual SFN according to the correct timing. Once the UE has determined the actual SFN according to the correct timing, the UE knows its position on the timeline according to the correct clock source (e.g., clock source maintained at the network) and the UE has acquired the correct timing, and is ready to receive pages from the network. In an aspect, the threshold value of the detection metric $d_i$ is designed to meet less than x % (e.g., 1%) probability of missed detection, meaning the threshold value of the detection metric $d_i$ is high enough such that the detection is stopped only when the generated $c_i$ bit stream and the input LLR vector are highly correlated. This ensures that the UE determines the correct timing with high accuracy.

In certain aspects, the UE may combine subsequent PBCH transmissions to improve PBCH detection. For example, if the value of the detection metric $d_i$ does not exceed the threshold value for the (2*Nmax+1) SFN hypotheses at a particular frame, the UE may perform PBCH detection for multiple frames and combine the results of the detection over the multiple frames.

FIG. 9 illustrates an example table 900 showing an example comparison between a baseline (e.g., currently existing) scheme for PBCH detection and the proposed scheme of SFN hypotheses based PBCH detection as discussed (e.g., with reference to FIG. 7) in accordance with aspects of the present disclosure.

The example of FIG. 9 assumes a sleep duration <=10.24*64 s and max. clock error=+/−10 PPM. This results in a timing error <=+/−6.6 ms. As shown in the first row or table 800 of FIG. 8, for a timing error of 10 ms or less, SFN can be acquired using the proposed scheme by hypothesizing PBCH over only 3 SFN possibilities.

Table 900 shows example data relating to PBCH detection performed for different SNR values using the proposed scheme as discussed in aspects of this disclosure and a baseline scheme (e.g., a currently used scheme). For example, the baseline scheme may use a tail biting Viterbi decoder to decode the PBCH.

In table 900, column 902 shows different values of SNR in db, column 904 shows time taken in milli seconds for PBCH detection in accordance with the proposed scheme, column 906 shows time taken in milli seconds for PBCH detection using the baseline scheme and column 908 shows the percentage power savings of the proposed scheme over the baseline scheme for each SNR value.

As shown in table 900, the proposed scheme provides significant power savings as compared to the baseline scheme by acquiring the correct timing considerably faster than the baseline scheme.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5A, 5B and 5C.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining one or more system frame number (SFN) hypotheses, each of the one or more SFN hypotheses representing a possible SFN at which the UE can wake up from a sleep state of a discontinuous reception (DRX) cycle;
    for at least one of the one or more SFN hypotheses:
        generating a detection metric based at least partially on a physical broadcast control channel (PBCH) sequence received from a base station and another PBCH sequence generated by the UE; and
        determining, based on a value of the detection metric, whether the at least one SFN hypothesis represents a current SFN in accordance with a clock source used by the base station for communicating with the UE;
    determining, based on the at least one SFN hypothesis, a timing to be used for communicating with the base station, when the at least one SFN hypothesis is determined as representing the current SFN; and
    communicating with the base station based on the determined timing.

2. The method of claim 1, further comprising determining a timing error related to a sleep state clock used by the UE in the sleep state of the DRX cycle, wherein the one or more SFN hypotheses is determined based at least one the timing error.

3. The method of claim 2, wherein the timing error comprises a maximum timing error related to the sleep state clock source used in the sleep state.

4. The method of claim 2, wherein determining the timing error comprises:
    determining the timing error as a function of a timing offset error related to the sleep state clock source and a sleep duration of the sleep state, wherein a value of the timing error comprises a number of frames, and wherein the one or more SFN hypotheses comprises one or more SFN hypothesis from a range of SFN hypotheses, wherein the range is a function of the value of the timing error.

5. The method of claim 1, wherein determining whether the at least one SFN hypothesis represents a current SFN comprises:
    determining that the at least one SFN hypothesis represents a current SFN in accordance with the clock source, when a value of the detection metric exceeds a threshold value.

6. The method of claim 1, wherein generating the detection metric comprises:
    comparing each coded bit in the generated other PBCH sequence with a log likelihood ratio (LLR) value representing a corresponding coded bit in the PBCH sequence received from the base station;
    flipping a sign of the LLR value when the corresponding coded bit in the generated other PBCH sequence is minus one; and after the comparing and flipping has been performed for all coded bits in the generated other PBCH sequence, generating a value of the detection metric by adding the remaining LLR values.

7. The method of claim 1, wherein a PBCH payload corresponding to the generated other PBCH sequence for the at least one SFN hypothesis comprises a first portion indicating an SFN corresponding to the SFN hypothesis and a second portion indicating other system information, wherein the SFN changes for only certain SFN hypotheses while the other system information remains the same.

8. The method of claim 1, wherein generating the other PBCH sequence for the at least one SFN hypothesis comprises:
    obtaining system information from a previous PBCH transmission;
    constructing a PBCH payload based on the obtained system information and the SFN corresponding to the at least one SFN hypothesis;
    generating PBCH data by adding cyclic redundancy check (CRC) bits to the constructed PBCH payload;
    coding the generated PBCH data to generate coded PBCH data; and
    scrambling the coded PBCH data to generate the other PBCH sequence.

9. The method of claim 8, wherein the generating the PBCH data and the coding is performed every fourth SFN hypothesis, wherein mod (SFN,4)=0, and wherein the scrambling is performed for every SFN hypothesis.

10. The method of claim 1, wherein the detection metric indicates a level of correlation between the generated other PBCH sequence and the PBCH sequence received from the base station, wherein a higher value of the metric indicates a higher level of correlation.

11. The method of claim 1, wherein the one or more SFN hypotheses is further based on an SFN calculated by the UE at start of SFN acquisition assuming zero timing error.

12. An apparatus for wireless communication by a user equipment (UE), comprising:
    at least one processor configured to:
        determine one or more system frame number (SFN) hypotheses, each of the one or more SFN hypotheses representing a possible SFN at which the UE can wake up from a sleep state of a discontinuous reception (DRX) cycle;
        for at least one of the one or more SFN hypotheses:
            generate a detection metric based at least partially on a physical broadcast control channel (PBCH) sequence received from a base station and another PBCH sequence generated by the UE; and
            determine, based on a value of the detection metric, whether the at least one SFN hypothesis represents a current SFN in accordance with a clock source used by the base station for communicating with the UE;
        determine, based on the at least one SFN hypothesis, a timing to be used for communicating with the base station, when the at least one SFN hypothesis is determined as representing the current SFN; and
        communicate with the base station based on the determined timing; and
    a memory coupled to the at least one processor.

13. The apparatus of claim 12, wherein the at least one processor is further configured to determine a timing error related to a sleep state clock used by the UE in the sleep state of the DRX cycle, wherein the one or more SFN hypotheses is determined based at least one the timing error.

14. The apparatus of claim 13, wherein the timing error comprises a maximum timing error related to the sleep state clock source used in the sleep state.

15. The apparatus of claim 12, wherein the at least one processor is configured to:
    determine that the at least one SFN hypothesis represents a current SFN in accordance with the clock source, when a value of the detection metric exceeds a threshold value.

16. The apparatus of claim 12, wherein the at least one processor is further configured to:
    compare each coded bit in the generated other PBCH sequence with a log likelihood ratio (LLR) value representing a corresponding coded bit in the PBCH sequence received from the base station;
    flip a sign of the LLR value when the corresponding coded bit in the generated other PBCH sequence is minus one; and
    after the comparing and flipping has been performed for all coded bits in the generated other PBCH sequence, generate a value of the detection metric by adding the remaining LLR values.

17. A non-transitory computer-readable medium for wireless communication by a user equipment (UE), storing instructions which when processed by at least one processor performs a method comprising:
    determining one or more system frame number (SFN) hypotheses, each of the one or more SFN hypotheses representing a possible SFN at which the UE can wake up from a sleep state of a discontinuous reception (DRX) cycle;
    for at least one of the one or more SFN hypotheses:
        generating a detection metric based at least partially on a physical broadcast control channel (PBCH) sequence received from a base station and another PBCH generated by the UE; and
        determining, based on a value of the detection metric, whether the at least one SFN hypothesis represents a current SFN in accordance with a clock source used by the base station for communicating with the UE;
    determining, based on the at least one SFN hypothesis, a timing to be used for communicating with the base station, when the at least one SFN hypothesis is determined as representing the current SFN; and
    communicating with the base station based on the determined timing.

18. The non-transitory computer-readable medium of claim 17, further comprising instructions for determining a timing error related to a sleep state clock used by the UE in the sleep state of the DRX cycle, wherein the one or more SFN hypotheses is determined based at least one the timing error.

19. The non-transitory computer-readable medium of claim 18, wherein the timing error comprises a maximum timing error related to the sleep state clock source used in the sleep state.

20. The non-transitory computer-readable medium of claim 17, wherein determining whether the at least one SFN hypothesis represents a current SFN comprises:
    determining that the at least one SFN hypothesis represents a current SFN in accordance with the clock source, when a value of the detection metric exceeds a threshold value.

21. The non-transitory computer-readable medium of claim 17, wherein generating the detection metric comprises:

comparing each coded bit in the generated other PBCH sequence with a log likelihood ratio (LLR) value representing a corresponding coded bit in the PBCH sequence received from the base station;

flipping a sign of the LLR value when the corresponding coded bit in the generated other PBCH sequence is minus one; and after the comparing and flipping has been performed for all coded bits in the generated other PBCH sequence, generating a value of the detection metric by adding the remaining LLR values.

22. A method for wireless communication by a user equipment (UE), comprising:

determining, for a system frame number (SFN) hypothesis, a detection metric based at least partially on a physical broadcast control channel (PBCH) sequence received from a base station and another PBCH sequence generated by the UE, the SFN hypothesis representing a possible SFN at which the UE can wake up from a sleep state;

determining, based on a value of the detection metric, whether the SFN hypothesis represents a current SFN in accordance with a clock source used by the base station for communicating with the UE;

determining, based on the SFN hypothesis, a timing to be used for communicating with the base station, when the SFN hypothesis is determined as representing the current SFN; and communicating with the base station based on the determined timing.

23. The method of claim 22, further comprising:

determining a timing error related to a sleep state clock source used by the UE in a sleep state of a discontinuous reception (DRX) cycle; and determining a plurality of SFN hypotheses based at least on the timing error, each of the plurality of SFN hypotheses representing a possible SFN at which the UE can wake up from the sleep state, wherein the SFN hypothesis is one of the plurality of SFN hypotheses.

24. The method of claim 23, wherein the timing error comprises a maximum timing error related to the sleep state clock source used in the sleep state.

25. The method of claim 23, wherein determining the timing error comprises:

determining the timing error as a function of a timing offset error related to the sleep state clock source and a sleep duration of the sleep state, wherein a value of the timing error comprises a number of frames, and wherein the SFN hypothesis is a SFN hypothesis from a range of SFN hypotheses, wherein the range is a function of the value of the timing error.

26. The method of claim 22, wherein determining whether the SFN hypothesis represents a current SFN comprises:

determining that the SFN hypothesis represents a current SFN in accordance with the clock source, when a value of the detection metric exceeds a threshold value.

27. The method of claim 22, wherein generating the detection metric comprises:

comparing each coded bit in the generated other PBCH sequence with a log likelihood ratio (LLR) value representing a corresponding coded bit in the PBCH sequence received from the base station;

flipping a sign of the LLR value when the corresponding coded bit in the generated other PBCH sequence is minus one; and after the comparing and flipping has been performed for all coded bits in the generated other PBCH sequence, generating a value of the detection metric by adding the remaining LLR values.

28. The method of claim 22, wherein a PBCH payload corresponding to the generated other PBCH sequence for the SFN hypothesis comprises a first portion indicating an SFN corresponding to the SFN hypothesis and a second portion indicating other system information, wherein the SFN changes for only certain SFN hypotheses while the other system information remains the same.

29. The method of claim 22, wherein generating the other PBCH sequence for the SFN hypothesis comprises:

obtaining system information from a previous PBCH transmission;

constructing a PBCH payload based on the obtained system information and the SFN corresponding to the SFN hypothesis;

generating PBCH data by adding cyclic redundancy check (CRC) bits to the constructed PBCH payload;

coding the generated PBCH data to generate coded PBCH data; and scrambling the coded PBCH data to generate the other PBCH sequence.

30. The method of claim 29, wherein the generating the PBCH data and the coding is performed every fourth SFN hypothesis, wherein mod (SFN,4)=0, and wherein the scrambling is performed for every SFN hypothesis.

31. The method of claim 22, wherein the detection metric indicates a level of correlation between the generated other PBCH sequence and the PBCH sequence received from a base station, wherein a higher value of the metric indicates a higher level of correlation.

\* \* \* \* \*